(12) United States Patent
Chopra et al.

(10) Patent No.: US 10,613,945 B1
(45) Date of Patent: Apr. 7, 2020

(54) SYSTEM AND METHOD FOR INTEGRATED DYNAMIC PARALLEL SAVE STREAM BACKUPS

(71) Applicant: EMC IP Holding Company LLC, Hopkinton, MA (US)

(72) Inventors: Shelesh Chopra, Bangalore (IN); Gururaj Kulkarni, Bangalore (IN); Vladimir Mandic, San Jose, CA (US); Peter Armorer, Milton (CA)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 15/497,526

(22) Filed: Apr. 26, 2017

(51) Int. Cl.
*G06F 11/14* (2006.01)
*G06F 3/06* (2006.01)

(52) U.S. Cl.
CPC ........ *G06F 11/1464* (2013.01); *G06F 3/0604* (2013.01); *G06F 3/067* (2013.01); *G06F 3/0644* (2013.01); *G06F 2201/84* (2013.01)

(58) Field of Classification Search
CPC .. G06F 11/1464; G06F 3/0604; G06F 3/0644; G06F 2201/84; G06F 3/067
See application file for complete search history.

(56) References Cited

U.S. PATENT DOCUMENTS

| | | | | |
|---|---|---|---|---|
| 7,975,061 B1* | 7/2011 | Gokhale | | G06F 3/0605 709/231 |
| 9,658,926 B1* | 5/2017 | Kulkarni | | G06F 11/1466 |
| 9,690,809 B1* | 6/2017 | Chai | | G06F 16/21 |
| 2015/0058448 A1* | 2/2015 | Proctor | | H04L 65/602 709/219 |
| 2015/0324255 A1* | 11/2015 | Kochunni | | G06F 11/1448 711/162 |

OTHER PUBLICATIONS

"Should I always use a parallel stream when possible?" on Stack Overflow. Posted Dec. 4, 2013. Available at <https://stackoverflow.com/questions/20375176/should-i-always-use-a-parallel-stream-when-possible/23370799#23370799>. (Year: 2013).*

* cited by examiner

*Primary Examiner* — Ann J Lo
*Assistant Examiner* — Jane Wei
(74) *Attorney, Agent, or Firm* — Staniford Tomita LLP

(57) ABSTRACT

A backup server is used to determine if dynamic parallel save streams (DPSS) between a storage device and a backup storage device is recommended. An analyzer on the backup server reviews the streaming information for data objects in a storage device. Based upon the data stream information, the analyzer can either recommend the implementation of DPSS or not recommend DPSS. If DPSS is recommended, the analyzer will further recommend a specific number of parallel save streams.

15 Claims, 7 Drawing Sheets

| Object Name | Production Storage | Streaming Configured at Production Storage | Streaming Configured at Application | OS Level Streaming Configured? | Should DPSS be Configured? | DPSS Recommended Streams |
|---|---|---|---|---|---|---|
| /xxx | Isilon | Yes | Yes | Yes | No | NA |
| /yyy | Netapp | NA | Yes | Yes | Yes | 4 Streams |
| /zzz | VNX | NA | No | NA | Yes | 8 Streams |
| /aaa | XIO | Yes | NA | NA | Yes | 4 Streams |
| /bbb | V3GR | No | NA | No | Yes | X Streams |

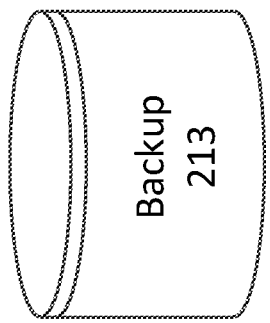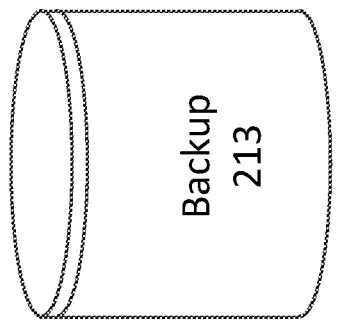
FIG. 3
FIG. 4

| Object Name (221) | Production Storage (223) | Is Stream Capability at Production Storage? (225) | Is Stream Configured at Production Storage? (227) | Is Application Streaming Possible? (229) | Is Stream Configured at Application (231) | Is OS Level Streaming Possible? (235) | Is OS Level Streaming Configured? (237) | Is DPSS Possible? (239) | Is DPSS Configured? (241) |
|---|---|---|---|---|---|---|---|---|---|
| /xxx (247) | Isilon | Yes | Yes | Yes | Yes | Yes | Yes | Yes | Yes |
| /yyy (249) | Netapp | No | NA | Yes | Yes | Yes | Yes | Yes | Yes |
| /zzz (251) | VNX | No | NA | Yes | No | NA | Yes | Yes | Yes |
| /aaa (253) | XIO | Yes | Yes | No | NA | No | NA | Yes | Yes |
| /bbb (255) | V3GR | Yes | No | No | NA | No | NA | Yes | Yes |

FIG. 5

SYSTEM AND METHOD FOR INTEGRATED DYNAMIC PARALLEL SAVE STREAM BACKUPS

Embodiments are generally directed towards a network-based data backup methods using parallel save streams.

COPYRIGHT NOTICE

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

In today's digital society organizations depend on having ready access to their data. Data, however, can be lost in a variety of ways such as through accidental deletion, data corruption, disasters and catastrophes (e.g., fires or flooding), media failures (e.g., disk crash), computer viruses, and so forth. Therefore, backups are needed to protect this data, which can be provided as a service. However, in today's world backup providers are under strenuous pressure to meet various service level agreements (SLAs). SLAs are characterized by providing additional backup services with fewer resources, which includes optimizing the cost models, honoring the backup SLAs and service level objectives (SLOs) which are already aggressively priced, as well as improve the total customer experience (TCE), and reduce the total cost of ownership (TCO).

There have been many advancements to data backup from both product and solution perspectives. By improving the way that backups are performed backup window times have been reduced. These backup processes can include: dynamic parallel save streams, multi-streaming, parallel processing and block based backups which are aimed at making the backup-as-a-service a very efficient business model. It can be appropriate to apply dynamic parallel save streams (DPSS) to backup some data objects. What is needed is a system for determining the data objects that are suitable for DPSS and recommending a number of data streams for the DPSS data objects.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Replicator, and Data Domain Boost are trademarks of EMC Corporation.

BRIEF DESCRIPTION OF THE FIGURES

In the following drawings, like reference numerals designate like structural elements. Although the figures depict various examples, the one or more embodiments and implementations described herein are not limited to the examples depicted in the figures.

FIG. 3 is a block diagram of an embodiment of a single stream backup.

FIG. 4 is a block diagram of an embodiment of a multiple parallel stream backup.

FIG. 5 illustrates an embodiment of a table with stream information for data objects.

DETAILED DESCRIPTION

Figure 1:
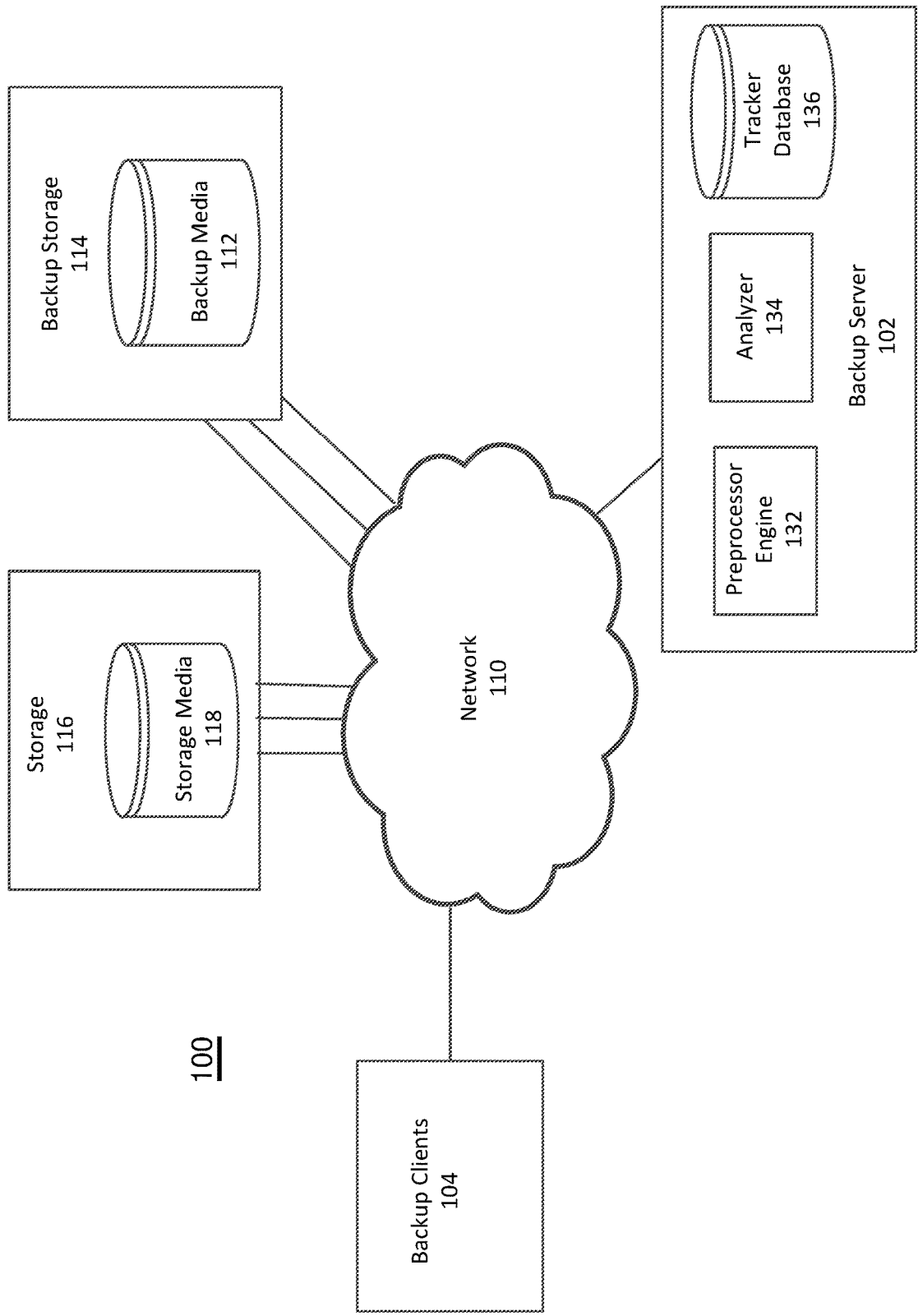
FIG. 1 is a block diagram of a network system for backing up data that can implement DPSS.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of the disclosed processes may be altered within the scope of the invention.

Disclosed herein are methods and systems for validating a backup application. The backup application can be used as part of a disaster recovery solution for large-scale networks. Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

FIG. 1 illustrates a computer network system 100 that implements one or more embodiments of a system for validating a backup application. In system 100, a number of clients 104 are provided to serve as backup clients or nodes. A network or backup server computer 102 is coupled directly or indirectly to these clients through network 110, which may be a cloud network, LAN, WAN or other appropriate network. The network 110 provides connectivity to the various systems, components, and resources of the system 100, which may be implemented using protocols such as Transmission Control Protocol (TCP) and/or Internet Protocol (IP), well known in the relevant arts. In a distributed network environment, network 110 may also represent a cloud-based network environment in which applications, servers and data are maintained and provided through a centralized cloud computing platform. In an embodiment, the system 100 may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The data generated within system 100 may be stored in a backup media 112 of a backup storage node 114 and some of the data can be stored in a long term retention media 118 of a long term retention storage 116. The backup media 112 and the long term retention media 118 may be located at any number of persistent storage locations and devices, such as local client storage, server storage, or network storage, which may be partially implemented through storage device arrays, such as RAID components. An embodiment network 100 may be implemented to provide support for various storage architectures such as Storage Area Network (SAN), Network-attached Storage (NAS), or Direct-Attached Storage (DAS) that make use of large-scale network accessible storage devices, such as large capacity tape or drive (optical or magnetic) arrays. In an embodiment, the target storage devices, such as tape or disk array may represent any practical storage device or set of devices, such as tape libraries, virtual tape libraries (VTL), fiber-channel (FC) storage area network devices, and OpenStorage Technology (OST) devices. In a specific embodiment, however, the target storage devices represent disk-based targets implemented through virtual machine technology.

For the embodiment of FIG. 1, network system 100 includes backup server 102, one or more backup clients 104, a storage device 116 having storage media 118, and a backup storage node 114 having backup media 112 which are each interconnected by a network 110. The backup server 102 can include a preprocessor engine 132, an analyzer 134 and a tracker database 136. The backup server 102 can control the movement of data from the storage device 116 to the backup storage 114. The preprocessor engine 132 can be a software module that obtains information about the data stored on the storage device 116 from tracker DB 136. The analyzer 134 can process information from the preprocessor engine 132. When Dynamic Parallel Save Streams (DPSS) is recommended by the analyzer 134, the data from the storage device 116 is transmitted to the backup storage 114 in multiple parallel data streams. The multiple lines between the storage 116 and the network 110 and the backup storage 114 can indicate the multiple parallel save streams when DPSS is implemented.

The DPSS feature is intended to increase net aggregate backup throughput written to the backend media. It splits the data save set into multiple save streams and backs up the data in parallel. DPSS allows the streams vacated from one save point to be reclaimed by another. This approach allows full utilization of all available save streams at any given time regardless of the number of save points specified for the backup or how many streams each save point began with.

Parallel save stream backup processing can be done at various levels of the data flow. For example, Isilon, NetApp, VNX and other storage systems can provide APIs to stream backup data files to the backup storage. These storage systems may have built-in algorithms to efficiently breakdown backup objects at the source. Then these backup objects are passed to various backup applications that either process further at the source like "Block Based Backups" (BBB), which then gets processed at the software (S/W) level in terms of parallel backup streaming or the dynamic streaming. What is needed is an integrated view of this whole DPSS flow. The present invention is directed towards providing the integrated view so that the system has both predictability as well as transparency for DPSS operation of the system. The inventive system can recommend whether DPSS is recommended or not. If DPSS is recommended, the system can then determine the optimum number of data streams to the backup storage.

The system can provide an integrated view on how the backup from the data storage device to the backup storage is streamed. The inventive system can have an intelligent backup algorithm that can determine if additional parallel data streams are need in the data storage device to the backup storage DPSS flow. The inventive system can intelligently parse every data object and take corrective action to the DPSS processing. In an embodiment, the system can indicate how many times the backup is streamed across the backup flow and what algorithms were used throughout the DPSS processing.

Figure 2:
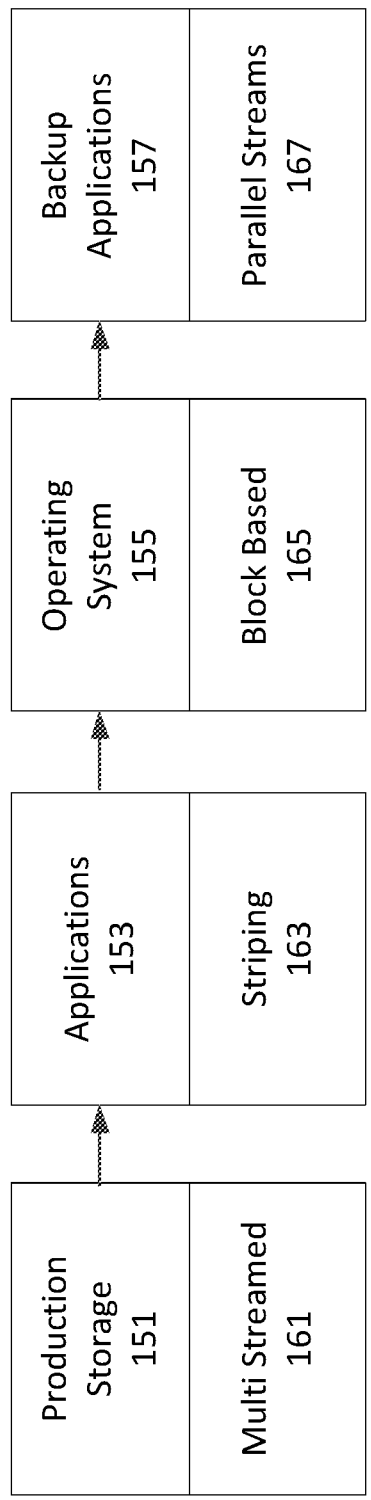
FIG. 2 shows a flow diagram of an embodiment of a backup process.

FIG. 2 illustrates an embodiment of a data backup flowchart, which can have various touch points and algorithms. This backup process can include multiple possible backup methodologies for the backup data objects. The production storage objects 151 can be backed up with a multi streamed 161 method. The production storage 151 backup can be processed with the application objects 153 and the application objects 153 can be backed up with a striping process 163. The production storage 151 and the application objects 153 backup data can be further processed with the operating system data 155. Operating system backup data 155 can be processed with a block based 165 backup method. The production storage 151, application 153, and the operating system 155 can be further processed with a backup application 157 which can be transmitted in multiple parallel data streams 167 to a backup storage system.

The inventive backup system can have several advantages. Known backups are less efficient when there are more blocks but less of a File System/Folder available. Scenarios like Incremental/Differential and Synthetic Full backups (forever incremental) are not covered well by known backup methods. Known parallel backup system technology is limited in its scope to just a few workflows and configurations. Thus, while known individual parallel stream technologies can be efficient, they have not been combined. The present invention provides a method for integrating known parallel stream processes that can significantly reduce the backup data processing time.

Parallel Save Streams (PSS) allow for a single sufficient large save point to be split into multiple concurrent save sets to speed up the backup walk process and therefore the overall backup. With reference to FIG. 3, traditionally, a single filesystem or single saveset, /bigfilesys 211, can be backed up as a single save operation to a backup storage device 213. Similar streaming or breaking down of chunks happens at various levels of the integration point of backup flow. The save point can be the file system, volume, or directory underneath.

With reference to FIG. 4, illustrates an embodiment of a DPSS backup system. With PSS enabled, the single save set, /bigfilesys 211 is split up and transmitted in multiple parallel save streams to the back storage device 213 using a DPSS method which splits the data save set into multiple save streams and backs up the data in parallel. DPSS allows the streams vacated from one save point to be reclaimed by another. This approach allows full utilization of all available save streams at any given time regardless of the number of save points specified for the backup or how many streams each save point has started with in the beginning. The inventive DPSS system can include an algorithm that analyzes the existing backup processing and intelligently applies parallel stream backups when it will be beneficial.

As discussed above, the backup server can include a Tracker DB that can store information about how the backup data objects are configured or not configured. With reference to FIG. 5, a table 219 illustrates an embodiment of the relevant information about the backup data objects. The names of the data objects can be listed in the "object name" column 221. The information about the backup data objects can include the following stream information:

Is the production storage capable of stream? 225.
Is streaming (multi streaming) configured at the production storage? 227.
Is application streaming possible? 229
Is streaming (striping) configured at the application? 231
Is operating system (OS) level streaming possible? 235
Is OS level streaming (block based) configured? 237
Is DPSS possible? 239
Is DPSS configured? 241

With reference to row 247 on table 219, the object/xxx is on an Isilon production storage platform. The data object has stream capability at the protection storage and the stream is configured at the production storage. Application streaming is possible and the stream is configured at the application. Additionally, the OS level streaming is possible and the OS level streaming is configured for/xxx. Finally, DPSS is possible and DPSS is configured.

The backup data object/yyy information is shown on row 249 of table 219. The /yyy backup data is on a Netapp product storage device that does not have streaming capability at the product storage. Because the product storage is not streaming capable, the stream configured at the production storage is not applicable (NA). The application streaming is possible, but the stream is not configured at the application. The OS level streaming is possible and the OS level streaming has been configured. DPSS is possible and DPSS is configured.

Row 251 shows the streaming information for backup data object/zzz. The production storage is a VNX storage system which is not capable of streaming at the production storage. The Application streaming is also not possible and the OS level streaming is also not possible. DPSS is possible and DPSS is configured.

The streaming information for backup data object/aaa is shown on row 253. The production storage is a XIO storage system which is capable of streaming and streaming has been configured at the production storage. The application streaming is not possible and the OS level streaming is not possible. DPSS is possible and DPSS is configured.

The streaming information for backup data object/bbb is shown on row 255. The production storage is a V3GR storage system. The streaming is capable at the production storage, but the stream has not been configured at the production storage. The application streaming is not possible and the OS level streaming is also not possible. DPSS is possible and DPSS is configured.

Figure 6:
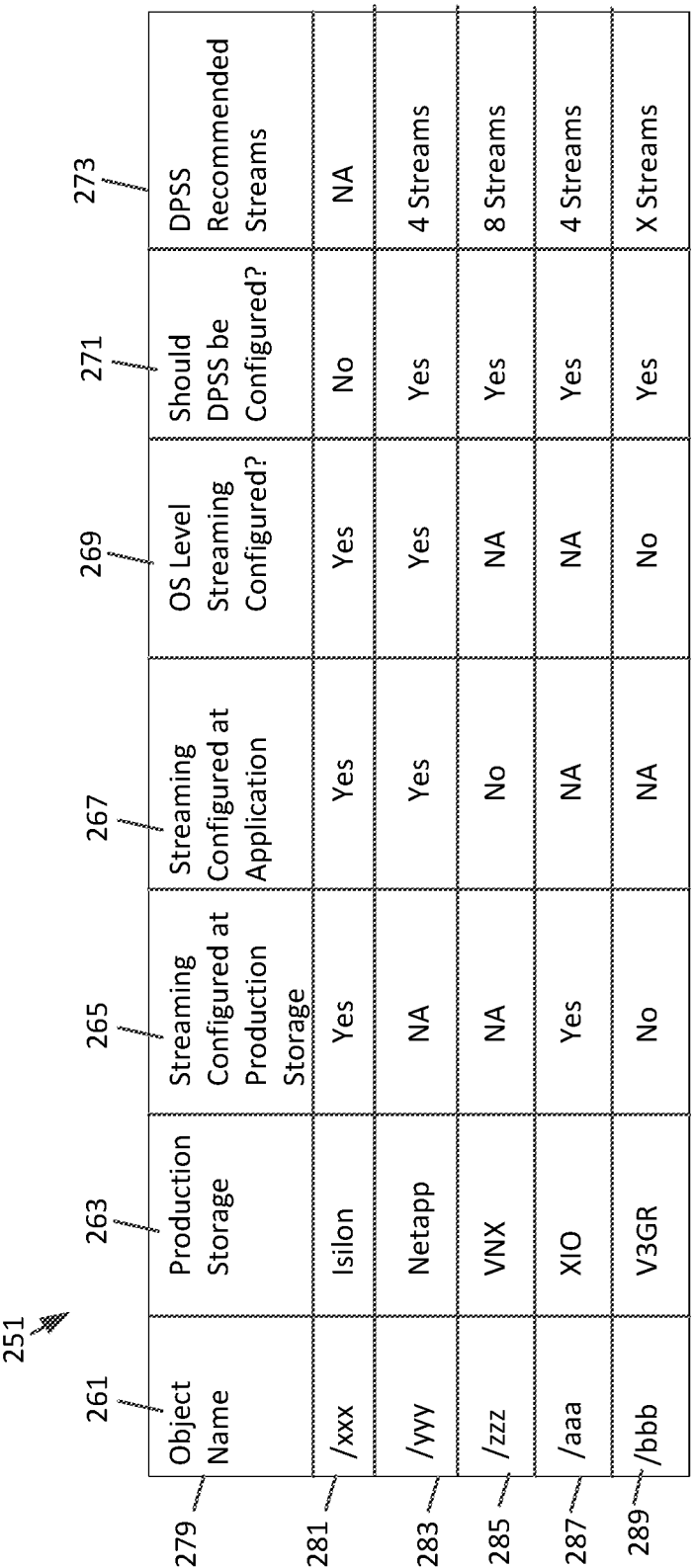
FIG. 6 illustrates an embodiment of a table with stream information used to recommend DPSS.

The analyzer shown in FIG. 1 can take the backup data information from the tracker DB and determine if the DPSS is recommended. If DPSS is recommended the system can have the DPSS configured and recommend a specific number of data streams. With reference to FIG. 6, the analyzer can consider the backup data information listed in table 251 when recommending DPSS configuration. The information considered by the analyzer can include: production storage 263, production storage is configured for streaming 265, application is configured for streaming 267, and is OS level streaming configured 269. The streaming information for each of these data can be Yes, No or not applicable (NA). NA can be an appropriate configuration listing if streaming the production storage, application or OS level is not possible.

With reference to row 281, the relevant information for backup object/xxx is listed. The production storage device is Isilon and the production storage, the application and the OS level are all configured for streaming. The analyzer does not recommend DPSS because the production storage, the application and the OS level are all already configured for streaming. Since the configuration of the DPSS is not recommended, the number of recommended DPSS streams is not applicable.

With reference to row 283, the information for backup object/yyy is listed. The production storage is Netapp and the production storage cannot perform streaming so the production storage is not configured for parallel streaming, the application and the OS level are configured for streaming. The analyzer recommends that the DPSS be configured for backup object/yyy with 4 streams.

With reference to row 285 the information for backup object/zzz is listed. The production storage device is VNX. The production storage and the OS level are not capable of parallel streaming, so the streaming configurations are NA.

The application can be streamed but the application is not configured for streaming. The analyzer has recommended 8 DPSS streams.

With reference to row 287, for backup data object/aaa on an XIO production storage device, parallel streaming at the production storage is not configured, streaming at the application is not applicable and OS level streaming is not applicable. The analyzer recommends that the DPSS be configured for backup object/zzz with 8 streams.

With reference to row 289, for backup data object/bbb on a V3GR production storage device, the parallel streaming is not configured at the production storage. Streaming is not applicable at the application. The OS level streaming is also not configured. The analyzer recommends that the DPSS be configured for backup object/bbb with X streams.

The described DPSS system is a simple embodiment. In other embodiments, the DPSS system algorithms can be based upon the other parameters like: size of data, number of data objects, the layout of data and other factors. Similarly, in other embodiments, the analyzer can add many other rules based on various other system and data details.

Figure 7:
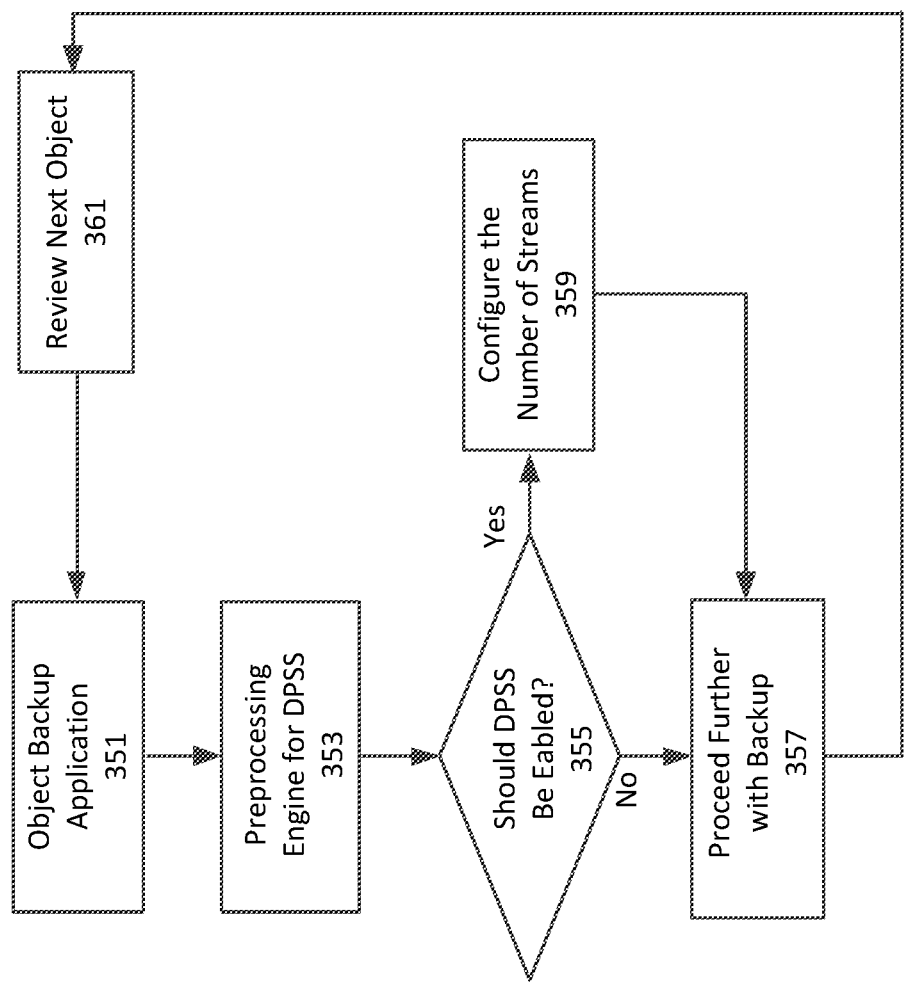
FIG. 7 illustrates an embodiment of a DPSS recommendation process flow chart.

With reference to FIG. 7, a basic DPSS processing flowchart is illustrated. The backup application 351 is forwarded to the processing engine for the DPSS system 353. The analyzer processes the stream information for the backup data object and determines if DPSS should be enabled 355. If the DPSS should be enabled, the analyzer will configure the number of parallel streams 359. If the DPSS should not be enabled, the system will proceed further with the backup of the backup data objects 357 without applying DPSS. The system can then review the next data object 361 and this process can be repeated for all backup data.

Figure 8:
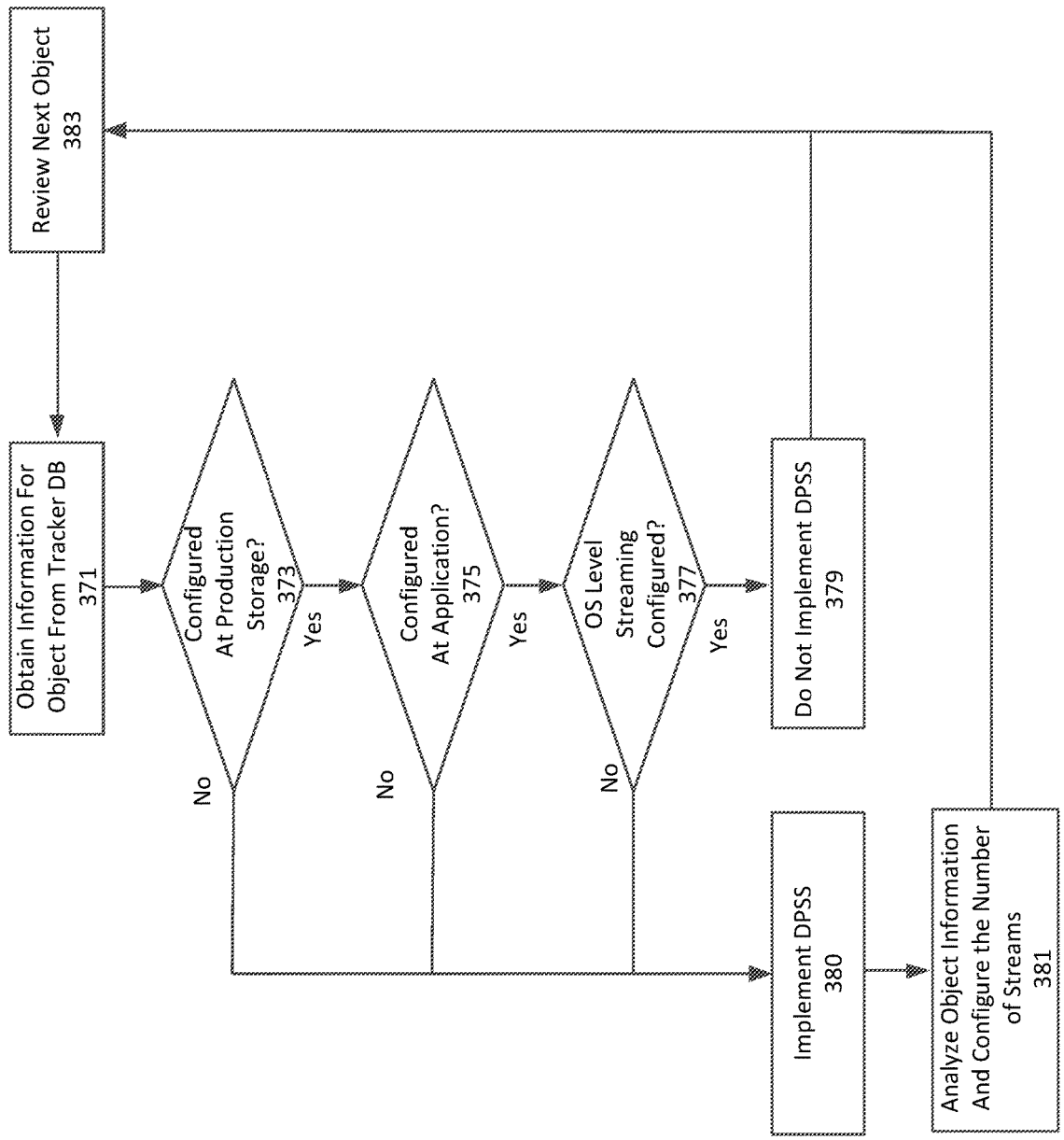
FIG. 8 illustrates an embodiment of a DPSS recommendation process flow chart.

FIG. 8 illustrates another embodiment of a DPSS processing flowchart. The analyzer can obtain stream information for a data object from the tracker DB 371. The analyzer will determine if the data object is configured for streaming at the production storage 373. If the object is not configured, the analyzer can recommend and implement DPSS 380. If the data object is configured for streaming at the production storage, the analyzer can determine if the data object is configured for streaming at the application 375. If the data object is not configured for streaming at the application, the analyzer can recommend and implement DPSS 380. If the data object is configured for streaming at the application, the analyzer can determine if the OS level streaming is configured 377. If the OS level streaming is not configured for streaming at the application, the analyzer can recommend and implement DPSS 380. If DPSS is implemented, the analyzer can analyze the backup data object information as well as additional system information. For example, in an embodiment, the number of streams can be based upon the size of the backup data object, the number of backup data objects, the configurations of the storage device as well as the backup data storage device, other algorithms and other factors. Based upon this information, the analyzer can recommend and configure the number of parallel streams 381. The system can then proceed to review the next object 383. If the OS level streaming is configured for streaming, the analyzer does not recommend DPSS 379 and the system can proceed to review the next object 383.

In an embodiment with reference to FIG. 1, the analyzer 134 can have a learning system which can be used to determine the optimum number of parallel streams from the storage device 116 to the backup storage 114 based upon past performance and improve the analysis performed by the DPSS system. The DPSS performance information can be stored on the tracker database 136 and the results can be reviewed to determine if the parallel stream algorithm used by the analyzer can be improved based upon past parallel stream performance data. If abnormally good or poor results are observed, the system can determine what factors were different with that number of streams. The system can then revise the parallel stream algorithm to reproduce the improved DPSS results while eliminating the poor results.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method for backing up data objects comprising:
providing a storage device storing the data objects, a backup storage device, and a backup server;
determining, by the backup server, that backup data for each of the data objects that will be transmitted from the storage device to the backup storage device in dynamic parallel save streams (DPSSs) based upon streaming information for the each of the data objects, wherein the streaming information includes: stream configuration status at a production storage of the data object, stream configuration status at a production storage of an application, and an operating system (OS) level streaming configuration status;
analyzing, by the backup server, information for the storage device and the backup storage device and data sizes for each of the data objects to determine a number of DPSSs for each of the data objects or if the DPSSs should not be implemented;
obtaining, by the backup server, for each of the data objects, configuration status of: a production storage streaming, an application streaming, and an OS level streaming;
transmitting the backup data for the data objects from the storage device to the backup storage device using the number of DPSSs determined by the backup server when the data object is not configured for streaming at the production storage, the data object is not configured for streaming at the application, or the OS level streaming for the data object is not configured; and
transmitting the backup data for the data objects from the storage device to the backup storage device without using DPSSs when the data object is configured for streaming at the storage device, the data object is configured for streaming at the application, and the data object is configured for streaming at the OS level while the DPSSs are available.

2. The method for backing up data objects of claim 1 wherein the backup server includes a tracker database that stores DPPS performance information.

3. The method for backing up data objects of claim 2 wherein the backup server includes an analyzer coupled to the tracker database.

4. The method for backing up data objects of claim 3 wherein the backup server determines includes a preprocessor engine coupled to the tracker database and the analyzer.

5. The method for backing up data objects of claim 4 wherein the preprocessor engine obtains the DPPS performance information from the tracker database.

6. A system for backing up data objects comprising:
a processor-based system executed on a computer system and configured to:
determine, by the backup server, that backup data for each of the data objects that will be transmitted from the storage device to the backup storage device in dynamic parallel save streams (DPSSs) based upon streaming information for the each of the data objects, wherein the streaming information includes: stream configuration status at a production storage of the data object, stream configuration status at a production storage of an application, and an operating system (OS) level streaming configuration status;
analyze, by the backup server, information for a storage device and a backup storage device and data sizes for each of the data objects to determine a number of the DPSSs for each of the data objects or if DPSS should not be implemented;
obtain, by the backup server, for each of the data objects, configuration status of: a production storage streaming, an application streaming, and an OS level streaming;
transmit the backup data for the data objects from the storage device to the backup storage device using the number of DPSSs determined by the backup server when the data object is not configured for streaming at the production storage, the data object is not configured for streaming at the application, or the OS level streaming for the data object is not configured; and
transmit the backup data for the data objects from the storage device to the backup storage device without using DPSSs when the data object is configured for streaming at the storage device, the data object is configured for streaming at the application, and the data object is configured for streaming at the OS while the DPSSs are available.

7. The system for backing up data objects of claim 6 wherein the backup server includes a tracker database that stores DPPS performance information.

8. The system for backing up data objects of claim 7 wherein the backup server includes an analyzer coupled to the tracker database.

9. The system for backing up data objects of claim 8 wherein the backup server determines includes a preprocessor engine coupled to the tracker database and the analyzer.

10. The system for backing up data objects of claim 9 wherein the preprocessor engine obtains the DPPS performance information from the tracker database.

11. A computer program product, comprising a non-transitory computer-readable medium having a computer-readable program code embodied therein, the computer-readable program code adapted to be executed by one or more processors to implement a method comprising:
providing a storage device storing the data objects, a backup storage device, and a backup server;
determining, by the backup server, that backup data for each of the data objects that will be transmitted from the storage device to the backup storage device in dynamic parallel save streams (DPSSs) based upon streaming information for the each of the data objects, wherein the streaming information includes: stream configuration status at a production storage of the data object, stream configuration status at a production storage of an application, and an operating system (OS) level streaming configuration status;
analyzing, by the backup server, information for the storage device and the backup storage device and data sizes for each of the data objects to determine a number of DPSSs for each of the data objects or if DPSS should not be implemented;
obtaining, by the backup server, for each of the data objects, configuration status of: a production storage streaming, an application streaming, and an OS level streaming;
transmitting some of the backup data for the data objects from the storage device to the backup storage device wherein for each of the data objects transmitted using the DPSSs, the data object is configured for streaming at the production storage, the data object is configured for streaming at the application, and the OS level streaming is configured;
wherein the backup data for the data objects that are configured for streaming at the storage device, an application, and an operating system (OS) level are transmitted from the storage device to the backup storage device not using the DPSSs while the DPSSs are available.

12. The computer program product of claim 11 wherein the backup server includes a tracker database that stores DPPS performance information.

13. The computer program product of claim 12 wherein the backup server includes an analyzer coupled to the tracker database.

14. The computer program product of claim 13 wherein the backup server determines includes a preprocessor engine coupled to the tracker database and the analyzer.

15. The computer program product of claim 14 wherein the preprocessor engine obtains the DPPS performance information from the tracker database.

* * * * *